United States Patent Office 3,327,245
Patented June 20, 1967

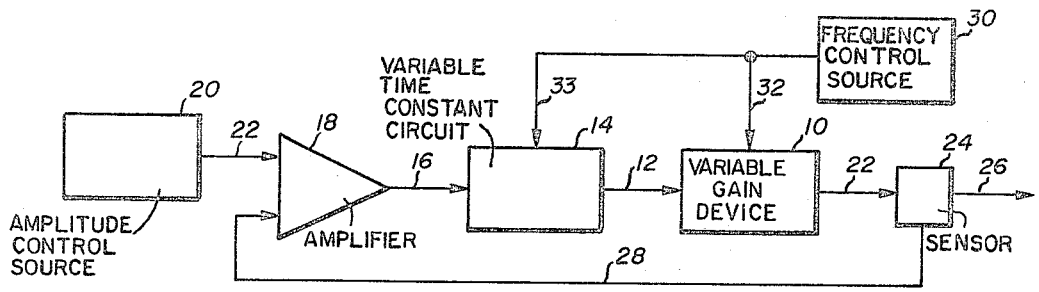
Fig. 1
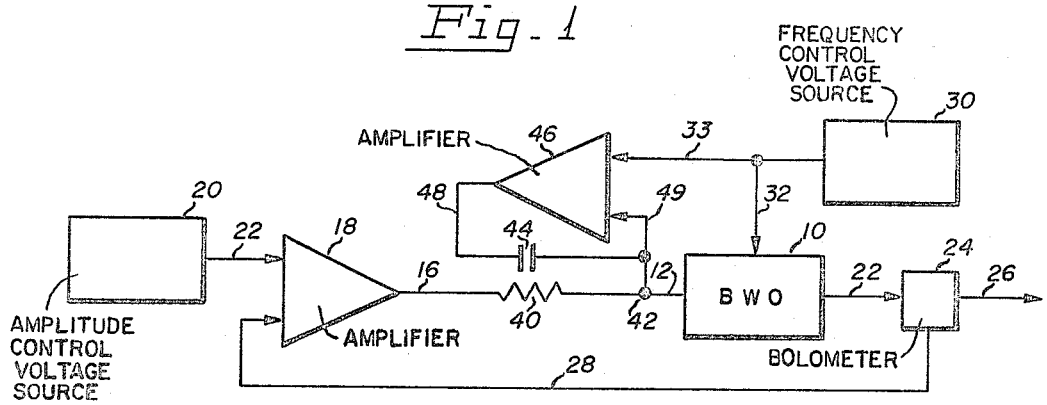
Fig. 2
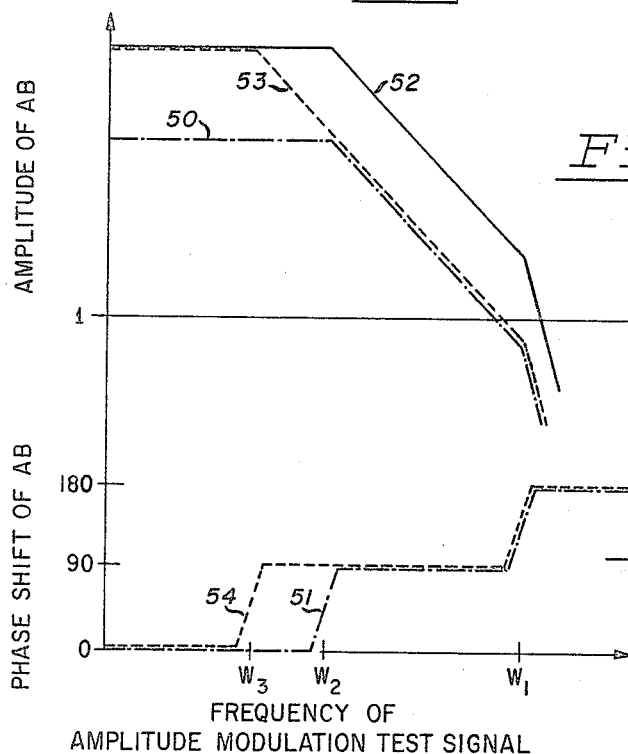
Fig. 3A
Fig. 3B
INVENTOR.
RALPH H. BRITTON, Jr.
BY
ATTORNEY

3,327,245
MEANS AND METHOD FOR STABILIZING NEGATIVE FEEDBACK SYSTEMS
Ralph H. Britton, Jr., Palo Alto, Calif., assignor to Alfred Electronics, Palo Alto, Calif., a corporation of California
Filed Sept. 30, 1963, Ser. No. 312,678
9 Claims. (Cl. 331—178)

This invention relates generally to negative feedback systems and more particularly to the stabilization of a negative feedback system which has a variable gain device in its forward loop portion.

It is well known to those skilled in the art that in negative feedback systems—such as negative feedback amplifiers, servo systems, control systems and the like—the magnitude and phase of the feedback voltage (or current) must be carefully controlled so that the system does not oscillate. The condition for stability in terms of the feedback voltage is often stated to be such that the feedback factor $A\beta$ must have a phase corresponding to a negative feedback voltage. If the feedback voltage reverses its polarity and becomes positive with respect to the signal applied to the input portion of the feedback system, it directly assists in the production of oscillation. Since the feedback factor $A\beta$ is proportional to the forward loop gain $A$ and the fraction $\beta$ of the output quantity applied to the feedback path, and since $\beta$ is usually a constant, the feedback factor $A\beta$ is directly proportional to the forward gain of the feedback system.

The forward loop gain $A$ of a typical negative feedback system is frequency dependent so that the feedback factor is likewise frequency dependent and usually falls off at the high and low end of a frequency band centered about an operating frequency. To have a stable feedback system it is desirable to maintain the maximum phase shift of the feedback voltage below $\pm 180°$ until the amplification in the forward loop has dropped to less than unity. This can easily be accomplished in feedback system by proper design.

If, in addition to the usual frequency dependence of the forward loop gain, a variable gain device is introduced into the forward loop, the feedback factor will vary with both the frequency of the input quantity and the gain variations of the variable gain device. It has been found that with both these effects present it is difficult to properly design the feedback systems for stability.

It is one of the primary objects of this invention to provide compensation for the effect of a variable gain device in a feedback system so that the feedback factor can be maintained at values for which the feedback system is stable. In accordance with this invention this compensation is provided by utilizing a variable time constant circuit which is made responsive to the same quantity which controls the gain of the variable gain device, so that, as the gain of that device increases, the time constant of the compensation circuit likewise increases to maintain the phase angle of the feedback factor substantially independent of the variation of the gain of the variable gain device.

Even though the variable time constant circuit for stabilizing a negative feedback system is applicable to all negative feedback systems having a variable gain device responsive to a control voltage changing its gain, the invention will be described herein with particular reference to a negative feedback system for generating microwave signals in which the variable gain device is a backward wave oscillator (BWO).

It is a primary object of this invention to provide a stable negative feedback system.

It is a further object of the invention to provide a means for stabilizing a negative feedback system which includes a variable gain device responsive to a control voltage.

It is another object of this invention to maintain a constant power output from a backward wave oscillator independent of the operating frequency.

It is still a further object of this invention to provide a compensating circuit which offsets the variation in the forward loop gain of a negative feedback system due to the presence of a variable gain device in the forward loop.

It is also an object of this invention to provide an improved microwave oscillator system whose output power is substantially independent of the operating frequency.

It is also an object of this invention to provide a new and improved microwave oscillator system which is stable at all frequencies, which has a constant passband substantially independent of the frequency, and in which the low frequency loop gain is sufficiently high for good stability.

It is a further object of this invention to compensate for the variation of sensitivity of a backward wave oscillator in a feedback system as the applied frequency controlling voltage is varied.

In accordance with a preferred embodiment of this invention a microwave generator, such as a backward wave oscillator, is located in the forward loop of a negative feedback system which controls the amplitude of the microwave output power in the conventional manner. Also, conventionally, a frequency controlling voltage is applied to the helix of the BWO. The primary result of changing this voltage is to change the frequency of oscillation, but a secondary consequence is to change the amplitude modulation sensitivity of the microwave generator and thereby the feedback factor $A\beta$. A variable time constant circuit is provided between the summing amplifier and the BWO which takes the form of a RC circuit having its capacitance varied in accordance with the frequency controlling voltage by means of a Miller integrator.

Further objects and advantages of the present invention will become apparent to those skilled in the art to which the invention pertains as the ensuing description proceeds.

The features of novelty that are considered characteristic of this invention are set forth with particularity in the appendant claims. The organization and method of operation of the invention itself will best be understood from the following description when read in connection with the accompanying drawing in which:

FIG. 1 is a schematic block diagram of a negative feedback system including a variable time constant circuit for stabilization in accordance with this invention;

FIG. 2 is a schematic block diagram of a negative feedback system showing incorporation of a particular time constant circuit exhibiting the Miller effect; and FIGS. 3A and 3B are illustrative curves useful in explaining the effect of the variable time constant circuit of this invention in a negative feedback system.

Referring now to the drawing, and particularly to FIG. 1 thereof, there is shown one embodiment of the instant invention in which a negative feedback system is stablized by means of a variable time constant circuit. The negative feedback system there shown includes a variable gain device 10 such as a backward wave oscillator (BWO). BWO's are well known to those skilled in the art and generally include an evacuated envelope housing an anode, a cathode, a control grid, a helix, and output plumbing.

The control grid of BWO 10 is connected to amplitude (or power) control lead 12 and the output plumbing is coupled, through a waveguide 22 or transmission line, to a microwave output member 26 which applies the generated microwave power to some utilization device (now shown). A portion of the output is applied to an amplitude or power sensing means 24, such as a bolometer, which senses the microwave output power and develops a feedback signal which is proportional to the output power, and applies this signal to a feedback path 28. The fraction of the output power applied to feedback path 28 is equal to $\beta$ which is usually very much smaller than 1, say 0.001 or less.

Lead 12 is connected to the output portion of a variable time delay circuit 14. The input portion of circuit 14 is connected, through lead 16, to the output section of a conventional differential (or difference) amplifier 18. One input terminal or differential amplifier 18 has applied thereto the amplitude modulating voltage from an amplitude control source 20, via lead 22, and the other input terminal has applied thereto the feedback voltage from path 28. In this manner, lead 16 conducts the error signal suitably amplified by amplifier 18 and applies the same to circuit 14 for suitable compensation of its phase and amplitude prior to application to the control grid of device 10.

The negative feedback system described so far, ignoring the presence of circuit 14, is a typical system for controlling the output power from a BWO. Any changes in the output voltage from amplitude control source 20 are faithfully reproduced in the output power delivered by output member 26. For any one frequency of BWO 10, the loop can readily be stabilized for a desired band of amplitude modulating frequencies. For proper design, the feedback factor $A\beta$ over the selected frequency band of the applied amplitude modulating frequencies should be constant and diminish at higher frequencies at a rate consistent with maintaining a phase shift of less than 180°. As long as the feedback factor is less than 1 when the phase angle is zero, the system is stable.

In the large majority of applications where a feedback controlled microwave oscillator is utilized it has been found desirable to also sweep or otherwise control the output microwave frequency. This is usually accomplished by applying a frequency controlling signal to the helix of the BWO. As shown in FIG. 1, a frequency control source 30 is connected to the helix of BWO 10 by a lead 32 to apply a selected frequency controlling signal to control the microwave frequency in a selected manner.

It is a well known fact that a change of the frequency controlling voltage applied to the helix of a BWO changes its gain or amplitude modulation sensitivity. The greater the magnitude of the frequency controlling voltage, the greater will be the frequency of the microwaves generated by the micowave generator and the greater will be the sensitivity or response of the generator to the amplitude modulating voltage on lead 12 controlling the power output. Accordingly, the effect of controlling the frequency of a BWO is to vary its gain and thereby the phase of the feedback factor $A\beta$.

Having properly designed a negative feedback system for stability through a desired range of amplitude modulating frequencies for a selected single microwave frequency supplied by the BWO, however, does not assure system stability when the microwave frequency is increased (or decreased). More particularly, increasing the microwave frequency beyond the frequency for which the system has been stabilized increases the feedback factor $A\beta$ and thereby the chances of the system to oscillate. Decreasing the frequency of oscillation of the BWO reduces the range of amplitude modulating frequencies.

In accordance with this invention, variable time constant circuit 14 is provided to control the amplitude and the phase response of the feedback system with increase of the magnitude of the BWO frequency controlling voltage. Circuit 14 is responsive to the magnitude of the frequency controlling voltage which is applied thereto by means of lead 33 and disposes of the excess high frequency gain of the modulating system at a rate proportional to the frequency of the microwave signal generated by BWO 10.

Referring now to FIG. 2 of the drawing, in which like reference characters designate the same parts shown in FIG. 1, there is illustrated by way of example a suitable variable time constant circuit for practicing the instant invention. As there seen, the variable time constant comprises an RC circuit including a resistive impedance 40 coupled to one side of a capacitive impedance 44 at circuit junction 42. The time constant $\tau$ of the RC circuit is controlled by varying the effective capacitive impedance seen by circuit junction 42 utilizing the Miller effect.

To this end an amplifier 46 is placed in parallel with capacitive impedance 44 through leads 48 and 49 and the gain of the amplifier is made responsive to the magnitude of the frequency controlling signal from frequency control source 30. Lead 33 connects source 30 to amplifier 46. The Miller effect is well known and provides a capacitive impedance at circuit junction 42 equal to $(1+a)C$ where $a$ is the amplification of the amplifier 46 and C is the capacitance of element 44.

The effect of variable time constant circuit 14 in the foreward loop of a negative feedback system is most strikingly illustrated with the aid of frequency response curves of the relative magnitude and phase of the feedback factor in open loop operation as depicted in FIGS. 3A and 3B. More particularly FIGS. 3A and 3B have the same abscissa representing the frequency of the applied amplitude modulating signal, and ordinates which respectively represent the relative magnitude and phase shift of the feedback factor.

Curves 50 and 51 represent the changes in the relative magnitude and phase shift of the feedback factor with changes of the amplitude modulation frequency for a given low magnitude frequency controlling signal, i.e. a signal producing in a microwave signal having a frequency at the low end of the desired band of output microwave frequencies. Similarly curves 52 and 51 (as before) represent the relative magnitude and phase shift at a frequency at the high end of the desired band of microwave frequencies resulting from a high magnitude frequency controlling signal in the absence of a variable time constant circuit 14. Curves 53 and 54 show the same quantities at the high end of the band in the presence of a compensating variable time constant circuit.

A comparison of curves 50 and 52 immediately shows that as the magnitude of the frequency controlling signal increases the amplitude response sensitivity of BWO 10 and therefore the feedback factor increases. The phase shift is dependent only on the time constants of the system, and does not change as shown by curve 51.

It can be seen from the curve 52 that at frequency $W_1$ the feedback factor $A\beta$ is greater than unity for a phase shift of 180 degrees. Thus the system will be unstable.

The action of the variable time constant circuit of this invention is to cause the point, at which the feedback factor $A\beta$ starts to decrease, to shift from the higher frequency $W_2$ to the lower frequency $W_3$ as shown by curve 53. This also causes the point at which the phase shifts from 0 degrees to 90 degrees to similarly change from $W_2$ to $W_3$. However, the point at which the phase shift becomes 180 degrees does not change and is still at $W_1$ as seen in curve 54. Referring again to curve 53, it is seen that now the feedback factor $A\beta$ is less than unity at a frequency lower than the frequency of a 180 degrees phase shift, and the system is again stable.

The operation of circuit 14 is also qualitatively explained by considering the impedance of circuit junction 42. The impedance of BWO 10 is usually very high, say of the order of 100 megohms. If the resistance of resistor 40 is of the order of 1000 ohms, the capacitance of capacitor 44 is of the order of 0.1 microfarad and the gain of amplifier 46 varies with the controlling signal between 0 and 100, then at amplitude modulation frequencies below 50 cycles per second no current will flow through resistance 40 because the capacitive impedance of element 44 is very high. Accordingly, the error signal applied to device 10 is substantially unchanged by circuit 14.

With increase of the controlling signal, the gain of amplifier 46 increases but for low frequency amplitude modulation circuit junction 42 remains substantially a high impedance point since the change of amplification is only 100 and therefore does not materially change the impedance at the low frequencies.

At high frequency amplitude modulation however, the capacitive impedance of element 44 is low and a current flows through resistor 40 decreasing the voltage of circuit junction 42 from say 1 volt to 0.01 volt. In this manner the amplitude of the error signal is materially reduced in magnitude which is exactly what is desired since the gain of device 10 has increased with increase of the controlling voltage. It is therefore seen that circuit 14 operates to reduce the magnitude of the error signal with increase of the controlling voltage by varying the impedance of circuit junction 42.

There has been described herein a means and a method for stabilizing a negative feedback system including a variable gain device through use of a variable time constant circuit. The compensating circuit is made responsive to the same quantity controlling the gain of the variable gain device to thereby maintain the phase angle of the feedback factor substantially independent of the gain of the variable gain device.

What is claimed is:

1. A wave energy signal generating system comprising:
   wave energy signal generator means including a first control element for controlling the amplitude and a second control element for controlling the frequency of the generated wave energy signal, the sensitivity of said generator means to amplitude control being incidentally a function of the frequency of the generated wave energy signal;
   means for providing a frequency control signal and applying the same to said second control element;
   means for providing an amplitude control signal;
   means responsive to the amplitude of the generated wave energy signal and operative to develop a feedback signal commensurate therewith:
   means responsive to said amplitude control signal and said feedback signal and operative to develop an error signal commensurate with their difference; and
   variable time constant circuit means having said error signal connected to its input terminal and having its output terminal connected to said first control element, said variable time constant circuit means being responsive to said frequency control signal to change its time constant in accordance with the magnitude of said frequency control signal to thereby maintain the feedback factor of the generating system within limits for stable operation.

2. In a negative feedback system which includes a voltage controlled signal oscillator in its forward loop portion which is responsive to the feedback system error signal to control its amplitude and which is further responsive to an externally applied control signal to control its frequency, and in which changes in the magnitude of the externally applied control signal incidentally cause changes in the gain of the signal oscillator, a forward gain compensating circuit for said feedback system comprising:
   a variable time constant circuit likewise responsive to said externally applied control signal and operative to change its time constant in accordance with the magnitude of said control signal, said time constant circuit being connected into the forward loop portion of said feedback system to operate upon the feedback system error signal.

3. In a negative feedback system which includes a voltage controlled signal oscillator in its forward loop portion which is responsive to the feedback system error signal to control its amplitude and which is further responsive to an externally applied control signal to control its frequency and in which changes in the magnitude of the externally applied control signal incidentally cause changes in the gain of the signal oscillator, a forward gain compensating circuit for said feedback system comprising:
   R-C circuit means including a variable capacitance means which is responsive to said externally applied control signal and which is operative to change its capacitive reactance in accordance with the magnitude of said externally applied control signal, said R-C circuit means being connected into the forward loop portion of said feedback system for changing the amplitude of the feedback system error signal in accordance with changes in the magnitude of the externally applied control signal.

4. In a negative feedback system having a backward wave oscillator, responsive to an externally applied frequency control signal, in its forward loop portion and in which the feedback system error signal is applied to the backward wave oscillator to control its output power, and in which changes in the magnitude of the frequency control signal incidentally causes changes in the gain of the backward oscillator, a stabilizing means comprising:
   variable impedance means connected into the forward loop portion of the feedback system for operating upon said feedback system error signal, said variable impedance means being responsive to said frequency control signal and operative to respectively decrease or increase the amplitude of the feedback system error signal with increase or decrease in the magnitude of said frequency control signal.

5. In a negative feedback system having an oscillator means, responsive to an externally applied frequency control signal, in its forward loop portion and in which the feedback system error signal is applied to the oscillator means to control its output power, and in which changes in the magnitude of the frequency control signal incidentally causes changes in the gain of the oscillator means, a stabilizing circuit comprising:
   a resistive impedance connected in series with said forward loop portion; and
   a variable capacitive reactance connected between a signal return and a circuit point in the forward loop portion intermediate said resistive impedance and said oscillator means, said capacitive reactance being responsive to said frequency control signal and operative to change its reactance commensurate with the magnitude of said frequency control signal.

6. A stabilizing circuit in accordance with claim 5 in which said capacitive reactance means includes a capacitor in parallel with a variable gain amplifier, and which said frequency control signal is utilized to control the gain of said variable gain amplifier.

7. The method of stabilizing a negative feedback system which includes a voltage controlled signal oscillator in its forward loop portion which is responsive to the feedback system error signal to control its amplitude and which is further responsive to an externally applied control signal to control its frequency, and in which changes in the magnitude of the externally applied control signal incidentally cause changes in the gain of the signal oscillator, the method comprising the step of:
   controlling the amplitude of the feedback system error signal in accordance with the magnitude of the externally applied controlled signal to maintain the feedback factor of the negative feedback system within the limits necessary for stable operation of the negative feedback system.

8. The method of stabilizing a negative feedback system which includes a voltage controlled signal oscillator in its forward loop portion which is responsive to the feedback system error signal to control its amplitude and which is further responsive to an externally applied control signal to control its frequency, and in which changes in the magnitude of the externally applied control signal incidentally cause changes in the gain of the signal oscillator, the method comprising the steps of:

reactively shunting the feedback error signal through a variable reactance and varying the reactance in accordance with the changes in the gain of the signal oscillator incidentally caused by changes in the magnitude of the externally applied control signal.

9. The method of stabilizing a negative feedback system which includes a voltage controlled signal oscillator in its forward loop portion which is responsive to the feedback system error signal to control its amplitude and which is further responsive to an externally applied control signal to control its frequency, and in which changes in the magnitude of the externally applied control signal incidentally cause changes in the gain of the signal oscillator, the method comprising the steps of:

connecting a resistance impedance element, having an impedance substantially smaller than the impedance of said variable gain device, in series with the feedback system error signal conduction path;

connecting a variable reactance element in shunt with the feedback system error signal conduction path to a point which is intermediate said resistive impedance element and said variable gain device; and varying the reactance of the reactance element in accordance with the changes of the gain of the signal oscillator incidentally caused by changes in the magnitude of the externally applied control signal.

References Cited

UNITED STATES PATENTS

| | | | |
|---|---|---|---|
| 2,617,037 | 11/1952 | Hugenholtz | 331—36 |
| 2,924,785 | 2/1960 | Sharp | 331—183 |
| 3,114,886 | 12/1963 | Santis et al. | 331—82 |

ROY LAKE, *Primary Examiner.*

J. KOMINSKI, *Assistant Examiner.*